United States Patent [19]
Olson

[11] 3,867,278
[45] Feb. 18, 1975

[54] HYDROCRACKING PROCESS USING IMPROVED PD-ON-SILICA-ALUMINA CATALYST

[75] Inventor: Lloyd J. Olson, Oakland, Calif.

[73] Assignee: Chevron Research Company, San Francisco, Calif.

[22] Filed: Oct. 23, 1973

[21] Appl. No.: 408,875

Related U.S. Application Data

[62] Division of Ser. No. 250,400, May 4, 1972, Pat. No. 3,801,515.

[52] U.S. Cl................ 208/111, 208/110, 208/112, 208/138, 208/143, 252/452, 252/454, 252/466 PT, 252/472, 260/683.3

[51] Int. Cl..... C10g 13/02, B01j 11/12, B01j 11/40

[58] Field of Search..................................... 208/111

[56] References Cited
UNITED STATES PATENTS

| | | | |
|---|---|---|---|
| 2,437,533 | 3/1948 | Huffman | 252/453 |
| 2,662,861 | 12/1953 | Riblett et al. | 252/455 R |
| 2,961,414 | 11/1960 | Burton et al. | 252/453 |
| 3,060,133 | 10/1962 | Jockers et al. | 252/472 |
| 3,155,627 | 11/1964 | Cole et al. | 252/477 R |
| 3,407,604 | 10/1968 | Keith et al. | 252/472 X |

Primary Examiner—Delbert E. Gantz
Assistant Examiner—G. E. Schmitkons
Attorney, Agent, or Firm—G. F. Magdeburger; R. H Davies; D. L. Hagmann

[57] ABSTRACT

This invention is concerned with catalysts, particularly those useful for hydroconversion, preferably hydrocracking, a process for using the catalyst, and a method for manufacturing the catalyst, which comprises:

A. forming in an aqueous medium a gelatinous precipitate and a finely divided catalytically active metal, the gelatinous precipitate comprising an inorganic oxide or precursor thereof and the metal being formed by reduction in the aqueous medium of a metal compound dissolved therein;

B. intimately intermixing the gelatinous precipitate and the metal within 2 hours of formation of the gelatinous precipitate, thereby forming a catalyst precursor;

C. converting the catalyst precursor to a catalyst. The conversion includes at least a step of heating the catalyst precursor at 500°–1,800° F. for 1 to 48 hours.

The preferred catalyst comprises a noble metal, preferably palladium on a silica-alumina support, particularly useful for hydrocracking processes.

13 Claims, No Drawings

HYDROCRACKING PROCESS USING IMPROVED PD-ON-SILICA-ALUMINA CATALYST

RELATED APPLICATION

This is a Division of Ser. No. 250,400, filed May 4, 1972, now U.S. Pat. No. 3,801,515, issued Apr. 2, 1974.

BACKGROUND OF THE INVENTION

1. Field

The present invention is concerned with catalysts, particularly those useful in hydroconversion processes, more preferably hydrocracking processes, a method of manufacturing the catalysts and a process for using the catalysts.

2. Prior Art

The prior art abounds with methods for the production of catalysts comprising a metal associated with the surface of a porous inorganic oxide support. In accordance with the prior art, said catalysts can be produced, for example, by impregnating a preformed inorganic oxide carrier with the metal or by coprecipitating the metal as an oxide or hydroxide along with the materials forming the porous inorganic oxide support; for example, the pH of a solution containing dissolved silica, alumina, and palladium can be adjusted to the point where the silica and alumina coprecipitate and the palladium is chemisorbed to a limited extent onto the resulting silica-alumina coprecipitate, said palladium being primarily in the form of soluble palladium hydroxide and/or soluble palladium salts. The palladium does not coprecipitate along with the silica and alumina since the palladium cation and, more particularly, palladium hydroxide, is soluble at pH's within the range that silica and alumina coprecipitate.

Various other methods for producing catalysts are set forth in the following patents: U.S. Pat No. 3,060,133 discusses reducing platinum in a solution and precipitating it out on a carrier;

U.S. Pat No. 2,437,533 teaches suspending an alumina gel in water and precipitating the combined oxides of cobalt and molybdenum onto the suspended alumina;

U.S. Pat. No. 2,662,861 teaches preparing a slurry of alumina, washing it, adding a promoter, preparing a suspension of platinum by bubbling hydrogen sulfide through a solution of chloroplatonic acid hexahydrate and mixing them.

U.S. Pat. No. 3,155,627 teaches preparing supported catalysts by reducing a metal complex to the elemental form in the presence of an extended substrate.

It has been surprisingly discovered that when catalysts comprising a metal associated with a porous inorganic oxide support are prepared by the method of the present invention, a larger proportion of the metal, preferably palladium, attempted to be incorporated into said catalysts is actually incorporated therein than is obtained by the prior art coprecipitation-plus-chemisorption method of catalyst preparation. It has also been surprisingly discovered that when a catalyst is prepared according to the present invention the resulting catalyst has higher catalytic hydrogenation stability than do prior art catalysts. It is believed that the higher catalytic hydrogenation stability found for the catalyst prepared in accordance with the present invention is the result of the attainment of a more uniform dispersion of the metal upon the surface of the porous inorganic oxide support than is obtained by the prior art methods of catalyst preparation.

SUMMARY OF THE INVENTION

In accordance with the present invention, a process is set out for preparing a catalyst comprising the steps:

A. Forming in an aqueous medium a gelatinous precipitate and a finely divided catalytically active metal, the gelatinous precipitate comprising an inorganic oxide or precursor thereof and the metal being formed by reduction in the aqueous medium of a metal compound dissolved therein;

B. Intimately admixing the gelatinous precipitate and the metal within 2 hours of formation of the gelatinous precipitate, thereby forming a catalyst precursor; and C. Converting the precursor to a catalyst, the converting including at least a step of heating said precursor at 500°–1800°F for 1 to 48 hours.

The preferred catalyst comprises a noble metal, preferably palladium on a silica-alumina support, particularly useful for hydrocracking processes.

DETAILED DESCRIPTION OF THE INVENTION

The Porous Inorganic Oxide Support

The catalyst of the present invention can be prepared on any suitable inorganic oxide support. The porous inorganic oxide supports useful in the present invention include a large number of materials with which the metal can be included. The support can be a single inorganic oxide or combinations of inorganic oxides. Typical inorganic oxides that can be used are silica, alumina, magnesia, zirconia, titania, and combinations thereof such as silica-alumina, silica-zirconia, silica-alumina-zirconia, silicamagnesia, silica-alumina-magnesia, or the like. The inorganic oxide supports for the purposes of the present invention must be porous, i.e., have a surface area of from 50 to 700 m²/gm., and more preferably from 150 to 700 m²/gm.

An amorphous silica-alumina support having an alumina content of 40 to 95 weight percent is the preferred support for the hydrocracking catalyst.

The Metal

Any suitable catalytically active metal can be used in the unique catalyst preparation process of the present invention. A suitable catalytic metal is a metal which will not substantially completely coprecipitate with the inorganic oxide (s) at the pH the precipitation of the inorganic oxide(s) occurs. The fact that the metal may chemisorb to some extent on the inorganic oxide gelatinous precipitate does not reduce the stability of the metal for use in the present invention.

The process of the present invention is especially useful with metals that are desirably composited with the catalyst at a relatively small concentration, for example, in a concentration in the range from about 0.01 to about 3 weight percent, and more preferably in the range from about 0.02 to about 1.0 weight percent. When a metal is present in the catalyst in a relatively low concentration, it is very desirable that the metal be finely divided and dispersed as uniformly as possible over the surface, both internal and external, of the support. This insures that a greater effective metal surface area will be present in the catalyst.

Preferably the catalytically active metal component used in the present invention is a metal component having hydrogenation-dehydrogenation activity. The most preferred hydrogenation-dehydrogenation metal components are the Group VIII noble metals, i.e., platinum, palladium, iridium, osmium, rhodium, and ruthenium, in an amount from 0.01 to 3 weight percent, and more preferably from 0.02 to 1.0 weight percent.

Metals which promote the activity of the Group VIII noble metals for hydrogenation-dehydrogenation, such as, for example, rhenium, technetium, lead, tin and germanium, which promoters are also generally present in an amount from 0.01 to 3 weight percent of the catalyst composite, and, more preferably, in the range from about 0.02 to about 1.0 weight percent, may also advantageously be incorporated in the catalyst by the method of the present invention. It is especially preferred to prepare a palladium-containing catalyst by the method of the present invention.

When the term "metal" is used herein to describe the catalyst prepared by the method of the present invention, it is understood that the metal or metal component may exist in the final catalyst as the metal, as an inorganic compound thereof, or as a mixture of the metal and an inorganic compound or compounds thereof. Thus, the metal may exist as the oxide, chloride, sulfide or the like.

The Gelatinous Precipitate

It is essential to the practice of the invention that the inorganic oxide gelatinous precipitate be freshly prepared. If the inorganic oxide gelatinous precipitate is allowed to age for a time before the solid is intimately intermixed therewith, an inferior catalyst will result. While not wishing to be bound to this explanation, it is believed that longer delays allow the gelatinous precipitate to further set up forming "cross links" which forestall uniform distribution of the metal on all the surfaces of the support. Preferably the fresh inorganic oxide gelatinous precipitate is prepared substantially immediately preceding the intimate intermixing of a solid therewith. Thus, it is preferred that no more than 2 hours, and preferably no more than 1 hour, elapse after the formation of the inorganic oxide gelatinous precipitate before the intimate intermixing occurs.

The intimate intermixing may be accomplished as follows: An aqueous medium containing: (1) dissolved precursors of the gelatinous precipitate, and (2) dissolved metal as a soluble compound, such as palladium tetraamine dinitrate, is prepared. The pH of the aqueous medium is adjusted until a fresh slurry of a gelatinous precipitate comprised of an inorganic oxide or precursor thereof is formed and the metal is then reduced through the use of a reducing agent, for example ascorbic acid, hydrazine or formaldehyde, to the elemental catalytically active metal, whereby a finely divided dispersion, preferably colloidal, of the metal is formed in the presence of the inorganic oxide gelatinous precipitate. Agitation is very desirable to intimately intermix the gelatinous precipitate and the finely divided metal.

Alternatively, the soluble metal compound can be added to the aqueous medium after the gelatinous precipitate has been formed. The dissolved metal compound is then reduced.

In either of these procedures it should be understood that some reduction of the metal may occur before the precipitation is complete.

While it is preferred that the gelatinous precipitate be formed prior to reduction of the metal, the method of manufacturing a catalyst of the present invention can be carried out by first reducing the metal compound followed by precipitation of the inorganic oxide or precursor thereof. It may in this situation be desirable to stabilize the finely divided catalytic metal to prevent agglomeration of the particles by use of suitable stabilizers such as casein, polyacrylic acid and the like.

The term "intimately intermixing" is used to mean that the finely divided metal is uniformly distributed on the surface of the gelatinous precipitate comprised of an inorganic oxide or precursor thereof. Generally, it is quite desirable that agitation take place to accomplish the intimate intermixing more completely. The agitation may be continuous or intermittent.

Once the finely divided metal has been intimately intermixed with the fresh gelatinous precipitate, the resulting intermixed metal-gelatinous precipitate catalyst precursor is, preferably dried, and then heated. Conventional methods can be used to form catalyst particles of a practical and useful size.

Generally, the intermixed metal-gelatinous precipitate precursor is formulated into particles as, for example, by extruding or the like, and the particles are then heated to a temperature within the range from about 500°F to about 1,800°F for from about 1 hour to about 48 hours. The heating will serve to calcine and activate the catalytic composite. Preferably, for hydrocracking catalysts, the heating will take place at a temperature within the range of from about 950°F to about 1,800°F for from about 2 hours to about 8 hours.

The catalyst produced in accordance with the invention will, after the heating step, preferably exhibit a parameter consisting of the product of the bulk density in grams per cc. of the particles and the surface area in square meters per gram, which falls within the range from about 100 m²/cc. to about 500 m²/cc., and more preferably, especially when the catalyst is a hydrocracking catalyst, within the range from about 200 m²/cc. to about 500 m²/cc.

Generally, the process for preparing a catalyst of the present invention will result in the incorporation of at least about 95 percent of the metal that is intimately intermixed with the gelatinous precipitate slurry into the intermixed solid-gelatinous precipitate.

The catalyst of the present invention is effective in converting a wide range of hydrocarbon feedstocks, including petroleum distillates, petroleum residua and various cycle stocks. Preferably the hydrocarbon feedstocks will boil within the range from about 400°F to about 1,050°F, more preferably from about 500°F to about 950°F.

The catalyst of the present invention is useful in many hydrocarbon hydroconversion processes, including hydrogenation, dehydrogenation, and reforming processes, but it is especially useful when used in a hydrocracking process.

When the process of the invention is used to make a hydrocracking catalyst, the organic nitrogen content of the hydrocarbon feedstock being hydrocracked should be below about 0.05 weight percent, preferably below about 0.02 weight percent, and more preferably below about 10 ppm. The organic sulfur content of the feedstocks also should be below about 0.05 weight percent, preferably below about 0.02 weight percent, and more preferably below about 10 ppm. If desired, the hydrocarbon feedstock may be subjected to a conventional hydrofining pretreatment step prior to being converted in the presence of the catalyst of the present invention.

Hydrocracking process conditions may be conventional conditions, for example, a temperature within the range from about 450°F to about 850°F, a pressure within the range from about 500 psig to about 3,500 psig, a liquid hourly space velocity within the range from about 0.5 to about 3.0, and a total hydrogen rate within the range from about 1,000 SCF to about 20,000 SCF, preferably from about 2,000 SCF to about 10,000 SCF of per barrel of feedstock.

When the catalyst is contacted with the hydrogen used in a hydrocracking reaction, some reduction to metal of any metal oxides that are present will take place. This is not detremental, and in fact is necessary to develop the catalytic hydrogenation activity of the catalyst, so long as the hydrogen does not contact the catalyst at a temperature appreciably higher than the reaction temperature at the start of the run, i.e., a temperature high enough to cause sintering of the metal on the catalyst with concurrent metal surface area reduction.

EXAMPLES

The invention will be better understood with reference to the illustrative examples which follow.

EXAMPLE 1 – PRIOR ART CATALYST

A catalyst which has palladium impregnated into a dried silica-alumina base is made as follows:

1130 grams of $ALCL_3 \cdot H_2O$ were dissolved in 5 litres of $H_2O$ and 125 ml. glacial acetic acid were added to form a first solution. 540 grams of sodium silicate were dissolved in 2.5 litres of water to form a second solution. Said first and second solutions were combined to form a mixture, the pH of which was adjusted to 7 by the addition of 3 litres of a solution of 2 parts $H_2O$ and 1 part $NH_4OH$. The resulting mixture, in the form of a suspension, was heated to 150°F, the pH was readjusted to 7, and the mixture was filtered to produce a cogel paste filter cake having a solids content of 8.06 weight percent. The filter cake was washed 4 times in 14 litres of 1 percent ammonium acetate at 150°F, once in 14 litres of $H_2O$ at 150°F, and was oven dried overnight at about 250°F. The resulting dried material had the following characteristics:

| | |
|---|---|
| Total solids content, wt. % | 71.3 |
| Pore volume of solids, cc./g. | 0.195 |
| $Al_2O_3/SiO_2$ weight ratio | 60/40 |

To 484 grams of the aforesaid dried alumina-silica material were added 8.869 grams of palladium tetraamine dinitrite dissolved in 95 ml. $H_2O$. The resulting mixture was stirred until evenly wetted and then dried in an oven overnight at 250°F. A portion of this material was calcined in sustantially dry air as follows:

| Temp., °F | Time, Hours |
|---|---|
| 450 | 4 |
| 1000 | 8 |
| 1600 | 4 |

This catalyst was used to hydrocrack a hydrocarbon feedstock consisting of a denitrified mixture of about 2 parts by volume of a California straight run gas oil and 1 part by volume of an FCC cycle oil. The hydrocarbon feedstock had the following characteristics:, 102

This feedstock was hydrocracked in a once-through run under the following conditions:

| | |
|---|---|
| Total pressure, psig | 1200 |
| Liquid hourly space velocity, V/V/hr. | 6.0 |
| Conversion, liquid vol. % to 550°F- | ≈60% |
| Hydrogen rate, SCF/bbl. of feed | 6600 |

Catalyst inspections and testing results are shown in Table I.

EXAMPLE 2 – CATALYST OF THE PRESENT INVENTION

A catalyst in accordance with the present invention in which palladium is precipitated as a metal sol within a silicaalumina gel was made as follows:

Solution A was 2,000 ml. water + 150 ml. glacial acetic acid + 2,150 ml. of an aqueous aluminum chloride solution containing 4.6 weight percent aluminum. Solution B was 301 ml. of sodium silicate solution, which is 28.7 weight percent $SiO_2$, + 1,500 ml. water + 1,43 grams palladium tetraamine dinitrate, which is 42 weight percent palladium. Solution B was added slowly to Solution A with rapid stirring. A clear solution resulted. The combined solution was titrated to pH 5.0 with a solution of 3 volumes water to one volume $NH_4OH$. The 4 ml. hydrazine were diluted to 100 ml. with water and added to the slurry. The titration with $NH_4OH$ solution was continued to pH 6.5 at which point gelation was substantially complete. 25 grams ascorbic acid were added within 15 minutes of completion of titration. The mixture then was heated to 170°F over 1 hour. During this step the palladium was reduced to a metal sol which was retained by the silica-alumina gel.

The slurry was then filtered to produce a filter cake which was partially dried to about 60 weight percent volatiles content. The solids were then exchanged with about 30 volumes of 1.0 weight percent ammonium acetate solution per volume solids and washed with 8 volumes of water. The catalyst was dried and calcined in substantially dry air as follows:

| Temp., °F | Time, Hours |
|---|---|
| 200 | 2 |
| 400 | 4 |
| 950 | 5 |
| 1400 | 2 |

This catalyst was tested with the same feed and conditions described in Example 1. Catalyst inspections and testing results are shown in Table I.

The catalyst of this example ran more than 50 percent longer than the prior art catalyst of Example 1, despite having only 15 percent of the noble metal content of the prior art catalyst.

EXAMPLE 3 — DEMONSTRATION THAT PALLADIUM PRECIPITATION IS NECESSARY

A catalyst was made essentially the same as Example 2, except that no hydrazine, ascorbic acid or other chemical was used to precipitate the palladium. Although sufficient palladium salt was added for the catalyst to contain 0.2 weight percent palladium, the finished catalyst contained only 0.03 weight percent palladium. About 85 percent of the palladium originally added went into the filtrate and wash solutions rather than remaining in the silica-alumina matrix.

This catalyst was tested with the same feed and test conditions described in Example 1. Catalyst inspections and test conditions are shown in Table I. Run length is very poor compared to the catalysts of Examples 1 and 2.

TABLE 1

|  | Example No. | | |
| --- | --- | --- | --- |
|  | 1 | 2 | 3 |
| Palladium content (Wt.%) | 0.88 | 0.13 | 0.03 |
| Bulk density, grams/cc. | 1.61 | 1.67 | 1.40 |
| Surface area, m²/gram | 266 | 318 | 342 |
| Final calcination temp. | 1600°F. | 1500°F. | 1400°F. |
| Run length (hrs. to 680°F) | 235 | 370 | <40 |

It is apparent that many widely different embodiments of this invention may be made without departing from the scope and spirit thereof; and, therefore, it is not intended to be limited except as indicated in the appended claims.

I claim:

1. A hydrocracking process comprising contacting a hydrocarbon feedstock and hydrogen with a catalyst under hydrocracking conditions, said catalyst being prepared by a method which comprises:
   A. forming in an aqueous medium a gelatinous precipitate and a finely divided catalytically active metal, said precipitate comprising an inorganic oxide or precursor thereof and said metal being formed by reduction in said medium of a metal compound dissolved therein, and said precipitate comprising on a water-free basis from 40 to 95 weight percent alumina and 60 to 5 weight percent silica, and said metal being palladium, and wherein ascorbic acid is used as a reducing agent for said reduction;
   B. intimately admixing said precipitate and said metal within 2 hours of formation of said precipitate, thereby forming a catalyst precursor;
   C. converting said precursor to a catalyst, said converting including at least a step of heating said precursor at 500°–1,800°F for 1 to 48 hours.

2. The process as in claim 1 wherein said gelatinous precipitate is formed prior to the reduction of said metal compound.

3. The process as in claim 1 wherein said catalyst contains an amount of the metal in the range from about 0.014 to 3 weight percent.

4. The process as in claim 1 wherein said catalyst contains an amount of the metal in the range from about 0.02 to 1.0 weight percent.

5. The process as in claim 1 wherein the activity of said catalyst is promoted by the presence in the catalyst of a metal promoter selected from the group consisting of rhenium, technetium, lead, tin and germanium, said promoter being present in an amount in the range from about 0.01 to 3 weight percent of the catalyst composite.

6. The process as in claim 5 wherein said amount is in the range from about 0.02 1.0 to 1.0 percent.

7. The process as in claim 1 wherein said heating step is effected at a temperature in the range from about 950°F to 1,800°F for a period in the range from about 2 to 8 hours.

8. The process as in claim 1 wherein said hydrocracking conditions include a temperature within the range from about 450°F to about 850°F, a pressure within the range from about 500 psig to about 3,500 psig, a liquid hourly space velocity within the range from about 0.5 to 3.0, and a total hydrogen rate within the range from about 1,000 standard cubic feet to about 20,000 standard cubic feet per barrel of feedstock.

9. The process as in claim 8 wherein said hydrogen rate is in the range from about 2,000 to 10,000 standard cubic feet.

10. The process as in claim 1 wherein said catalyst is prepared in accordance with the method described in Example 2 of this specification and said process feedstock and hydrocracking conditions are in accordance with those described in Example 1 of this specification.

11. The process as in claim 1 wherein said feedstock is selected from the group consisting of petroleum distillate, petroleum residua and cycle stocks.

12. The process as in claim 11 wherein said feedstocks boil within the range from about 400°F to 1,050°F at 1 atmosphere pressure.

13. The process as in claim 12 wherein said temperature range is from about 500°F to 950°F.

* * * * *

UNITED STATES PATENT OFFICE
CERTIFICATE OF CORRECTION

PO-1050 (5/69)

Patent No. 3,867,278     Dated February 18, 1975

Inventor(s) Lloyd J. Olson

It is certified that error appears in the above-identified patent and that said Letters Patent are hereby corrected as shown below:

Col. 5, line 9, "of per" should read --of hydrogen per--.

Col. 5, line 13, "detremental" should read --detrimental--.

Col. 5, line 67, after "characteristics:", delete ",102", and add the following:

ASTM D-1160 Boiling Range, °F.

| | |
|---|---|
| Start | 553 |
| 5% | 589 |
| 10% | 595 |
| 30% | 617 |
| 50% | 646 |
| 70% | 684 |
| 90% | 732 |
| 95% | 763 |
| End | 859 |

Other Characteristics

| | |
|---|---|
| Gravity, °API | 39.9 |
| Aniline point, °F. | 192.7 |
| Sulfur, ppm | 1-2 |
| Nitrogen, ppm | 0.1 |
| Pour point, °F. | +55 |
| Paraffins + naphthenes, Vol. % | 90 |
| Aromatics, Vol. % | 10 |

Col. 6, line 16, "silicaalumina" should read --silica-alumina--.

Col. 6, line 22, "1,43" should read --1.43--.

Col. 6, line 27, "The" should read --Then--.

PO-1050
(5/69)

UNITED STATES PATENT OFFICE
CERTIFICATE OF CORRECTION

Patent No. 3,867,278    Dated February 18, 1975

Inventor(s) Lloyd J. Olson    Page 2

It is certified that error appears in the above-identified patent and that said Letters Patent are hereby corrected as shown below:

Page 2

Col. 8, Claim 3, line 3, "0.014to 3" should read --0.01 to 3--.

Col. 8, Claim 6, line 2, "0.02 1.0to 1.0" should read --0.02 to 1.0--.

Signed and sealed this 27th day of May 1975.

(SEAL)
Attest:

RUTH C. MASON
Attesting Officer

C. MARSHALL DANN
Commissioner of Patents
and Trademarks